US012179199B2

(12) United States Patent
Lee et al.

(10) Patent No.: US 12,179,199 B2
(45) Date of Patent: Dec. 31, 2024

(54) MICROFLUIDIC SINGLE-CELL PAIRING ARRAY FOR STUDYING CELL-CELL INTERACTIONS IN ISOLATED COMPARTMENTS

(71) Applicant: THE REGENTS OF THE UNIVERSITY OF CALIFORNIA, Oakland, CA (US)

(72) Inventors: Abraham P. Lee, Irvine, CA (US); Xuan Li, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 971 days.

(21) Appl. No.: 16/988,179

(22) Filed: Aug. 7, 2020

(65) Prior Publication Data

US 2021/0039104 A1 Feb. 11, 2021

Related U.S. Application Data

(60) Provisional application No. 62/884,801, filed on Aug. 9, 2019.

(51) Int. Cl.
*B01L 3/00* (2006.01)

(52) U.S. Cl.
CPC ................... *B01L 3/502761* (2013.01); *B01L 2200/0647* (2013.01); *B01L 2200/0668* (2013.01);
(Continued)

(58) Field of Classification Search
CPC ....... B01L 3/502761; B01L 2200/0647; B01L 2200/0668; B01L 2300/0883;
(Continued)

(56) References Cited

U.S. PATENT DOCUMENTS

| | | | |
|---|---|---|---|
| 2,656,508 | A | 10/1953 | Coulter |
| 3,380,584 | A | 4/1968 | Fulwyler |
| 4,009,435 | A | 2/1977 | Hogg |
| 5,465,582 | A | 11/1995 | Bliss et al. |
| 8,263,023 | B2 | 9/2012 | Le Vot et al. |

(Continued)

FOREIGN PATENT DOCUMENTS

| | | |
|---|---|---|
| GB | 2395196 | 5/2004 |
| WO | WO2007120240 A2 | 10/2007 |

(Continued)

OTHER PUBLICATIONS

Chung et al (Imaging single-cell signaling dynamics with a deterministic high-density single-cell trap array, Analytical Chemistry, 2011 83(18), 7044-7052 (Year: 2011).*

(Continued)

*Primary Examiner* — Paul S Hyun
*Assistant Examiner* — Jean Caraballo-Leon
(74) *Attorney, Agent, or Firm* — NGUYEN TARBET IP LAW

(57) ABSTRACT

A microfluidic device having an array for cell trapping is used to analyze cell-cell interaction at single-cell level. The microfluidic trapping array efficiently pairs single cells in isolated compartments in an easy-to-operate manner. A first cell is squeezed through an opening of a first cavity by a strong forward flow. Subsequently, a second cell is pushed into a second cavity by a low reverse flow. The trapped cell pairs are sealed by an oil phase or hydrogel into isolated compartments, thereby eliminating interference from other cell pairs or the surrounding media.

6 Claims, 6 Drawing Sheets
(6 of 6 Drawing Sheet(s) Filed in Color)

(52) U.S. Cl.
CPC .................. *B01L 2300/0883* (2013.01); *B01L 2400/0481* (2013.01)

(58) Field of Classification Search
CPC ..... B01L 2400/0481; B01L 2300/0816; B01L 2400/0487; B01L 2400/086; B01L 3/5085; B01L 2300/0636; B01L 2300/0819; B01L 2300/0829; B01L 2300/0896
See application file for complete search history.

(56) References Cited

U.S. PATENT DOCUMENTS

| | | | | |
|---|---|---|---|---|
| 8,365,311 | B2 | 1/2013 | Nawarathna | |
| 8,927,040 | B2 | 1/2015 | Brand et al. | |
| 9,176,504 | B2 | 11/2015 | Chiou et al. | |
| 2002/0182654 | A1 | 12/2002 | Jing et al. | |
| 2004/0072278 | A1* | 4/2004 | Chou | G01N 15/1456 436/63 |
| 2004/0234588 | A1 | 11/2004 | Lu et al. | |
| 2005/0015001 | A1 | 1/2005 | Lec et al. | |
| 2005/0106064 | A1 | 5/2005 | Laurell et al. | |
| 2005/0272039 | A1 | 12/2005 | Yasuda | |
| 2005/0272096 | A1 | 12/2005 | Clague et al. | |
| 2006/0051329 | A1 | 3/2006 | Lee et al. | |
| 2006/0177815 | A1 | 8/2006 | Soh et al. | |
| 2007/0264320 | A1 | 11/2007 | Lee et al. | |
| 2008/0038807 | A1 | 2/2008 | Pommersheim | |
| 2008/0241875 | A1 | 10/2008 | Hwang et al. | |
| 2009/0042310 | A1 | 2/2009 | Ward et al. | |
| 2009/0068170 | A1 | 3/2009 | Weitz et al. | |
| 2009/0075390 | A1 | 3/2009 | Linder et al. | |
| 2009/0286300 | A1 | 11/2009 | Le Vot et al. | |
| 2009/0298191 | A1 | 12/2009 | Whitesides et al. | |
| 2011/0059556 | A1 | 3/2011 | Strey et al. | |
| 2011/0086352 | A1 | 4/2011 | Bashir et al. | |
| 2011/0285042 | A1 | 11/2011 | Viovy et al. | |
| 2012/0034155 | A1 | 2/2012 | Hyde et al. | |
| 2012/0107912 | A1 | 5/2012 | Hwang et al. | |
| 2012/0196288 | A1 | 8/2012 | Beer | |
| 2013/0078163 | A1* | 3/2013 | Chung | C12M 21/06 422/502 |
| 2013/0154671 | A1 | 6/2013 | Lee et al. | |
| 2013/0171628 | A1 | 7/2013 | Di Carlo et al. | |
| 2013/0210649 | A1 | 8/2013 | McKnight et al. | |
| 2014/0011291 | A1 | 1/2014 | Patel et al. | |
| 2014/0068797 | A1 | 3/2014 | Doudna et al. | |
| 2014/0076430 | A1 | 3/2014 | Miller et al. | |
| 2015/0018226 | A1 | 1/2015 | Hansen et al. | |
| 2016/0033378 | A1 | 2/2016 | Husain et al. | |
| 2016/0123858 | A1 | 5/2016 | Kapur et al. | |
| 2016/0202153 | A1 | 7/2016 | Gadini et al. | |
| 2017/0014449 | A1 | 1/2017 | Bangera et al. | |
| 2017/0128940 | A1 | 5/2017 | Amini et al. | |
| 2017/0145169 | A1 | 5/2017 | Oakey et al. | |
| 2017/0183722 | A1 | 6/2017 | Link | |
| 2018/0030515 | A1 | 2/2018 | Regev et al. | |
| 2018/0078940 | A1 | 3/2018 | Lee et al. | |

FOREIGN PATENT DOCUMENTS

| | | | | |
|---|---|---|---|---|
| WO | WO2015157567 A1 | 10/2015 | | |
| WO | WO2016040476 A1 | 3/2016 | | |
| WO | WO2016126871 A2 | 8/2016 | | |
| WO | WO2017070169 A1 | 4/2017 | | |
| WO | WO-2018183744 A1 * | 10/2018 | | B01L 3/502715 |

OTHER PUBLICATIONS

Li et al. (In situ mRNA isolation from a microfluidic single cell array using an external AFM nanoprobe, Lab on a Chip, 2017, 17 1635 (Year: 2017).*

International Search Report for PCT Application No. PCT/US18/56852 Issued on Jan. 11, 2019.

Lin, R., et al. "High efficiency cell encapsulation utilizing novel on-demand droplet generation scheme and impedance-based detection." 14th international conference on miniaturized systems for chemistry and life sciences, ed. H. Andersson-Svahn, S. Verpoorte, J. Emineus, N. Pam me. 2010.

J. Kim, M. Chung, S. Kim, D. H. Jo, J. H. Kim, and N. L. Jeon, "Engineering of a Biomimetic Pericyte-Covered 3D Microvascular Network," Plos One, vol. 10, p. e0133880, 2015.

K. Wang, D. T. T. Phan, A. Sobrino, S. C. George, C. C. W. Hughes, and A. P. Lee, "Engineering anastomosis between living capillary networks and endothelial cell-lined microfluidic channels," Lab on a Chip, vol. 16, pp. 282-290, 2016.

Mazutis, L. et al., Lab on a Chip, vol. 9, pp. 2665-2672 (2009).

Simon, M.G et al., Label-Free Detection of Dna Amplification in Dropletsusing Electrical Impedance, 15th International Conference on Miniaturized Systems for Chemistry and Life Sciences 2011 (MicroTAS 2011), pp. 1683-1685 (Year: 2011).

Marsh et al. Room temperature ionic liquids and their mixtures—a review. Fluid Phase Equilibria 219 (2004) 93-98.

Oh, Woon Su, "Synthesis and applications of imidazolium-based ionic liquids and their polymer derivatives" (2012). Doctoral Dissertations. 1958. http://scholarsmine.mst.edu/doctoral_dissertations/1958.

Baret et al., "Fluorescence-activated droplet sorting (FADS): efficient microfluidic cell sorting based on enzymatic activity," Lab Chip. Jul. 7, 2009; 9(13): 1850-8. doi: 10.1039/b902504a. Epub Apr. 23, 2009.

Macosko et al., "Highly Parallel Genome-wide Expression Profiling of Individual Cells Using Nanoliter, Droplets," Cell, vol. 161, No. 5, pp. 1202-1214, May 2015.

International Search Report for PCT Application No. PCT/US18/36962 Issued on Aug. 30, 2018.

International Search Report for PCT Application No. PCT/US18/36952 Issued on Sep. 18, 2018.

Inexpensive Droplet-Based Microfluidic Platform. CIDAR lab. https://www.youtube.com/watch?v=aHvfEOlh_b4.

Kamalakshakurup et al. High-efficiency single cell encapsulation and size selective capture of cells in picoliter droplets based on hydrodynamic micro-vortices. Lab Chip, 2017, 17, 4324-4333.

Brouzes, Eric, et al. "Droplet microfluidic technology for single-cell high-throughput screening." Proceedings of the National Academy of Sciences106.34 (2009): 14195-14200.

S. I. Rubinow and J. B. Keller, "The transverse force on a spinning sphere moving in a viscous fluid," J. Fluid Mech., vol. 11, No. 03, p. 447, Nov. 1961.

Murata et al., Electrochemical single-cell gene-expression assay combining dielectrophoretic manipulation with secreted alkaline phosphatase reporter system, 2009, Biosensors and Bioelectronics, 25, 913-919.

Stinson et al., Genes Expressed in the Male Gametophyte of Flowering Plants and Their Isolation, 1987, Plant Physiol., 83, 442-447.

International Search Report for PCT Application No. PCT/US2016/056683 Issued on Dec. 27, 2016.

International Search Report for PCT Application No. PCT/US18/55722 Issued on Feb. 6, 2019.

International Search Report for PCT Application No. PCT/US17/55984 Issued on Dec. 14, 2017.

Doria, Arlene et al., "Rapid blood plasma separation with air-liquid cavity acoustic transducers", 15th International conference on miniaturized systems for chemistry and life sciences, Oct. 2-6, 2011, pp. 1882-1884.

Lee, Abraham P. et al. , "Microfluidic air-liquid cavity acoustic transducers for on-chip integration of sample preparation and sample detection", Journal of laboratory automation, Dec. 2010, vol. 15, No. 6, pp. 449-454.

International Search Report Issued for PCT Application No. PCT/US2013/042735 on Nov. 28, 2013.

Kobel et al. Optimization of microfluidic single cell trapping for long-term-on-chip culture. Lab on Chip. pp. 857-863 Jan. 13, 2010.

* cited by examiner

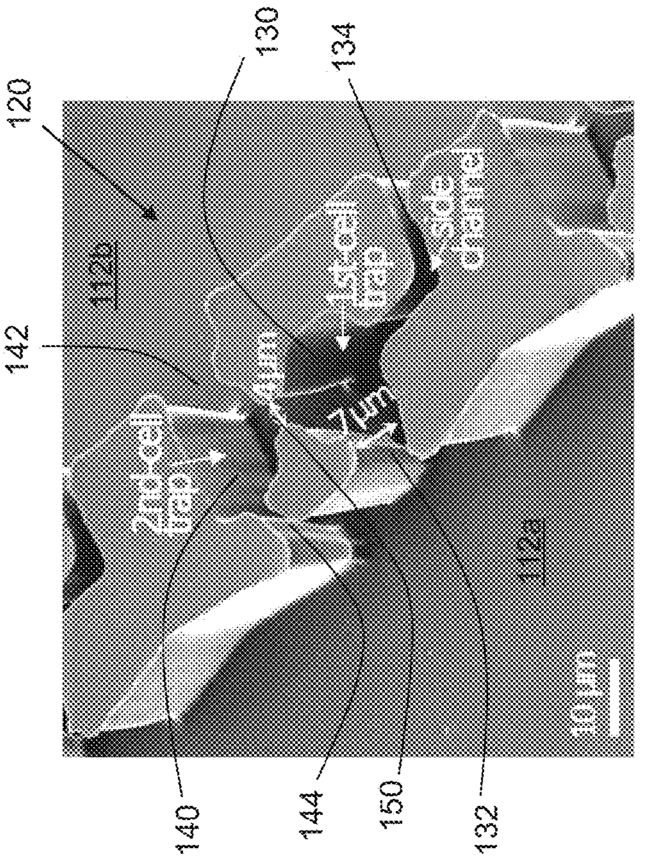
FIG. 1
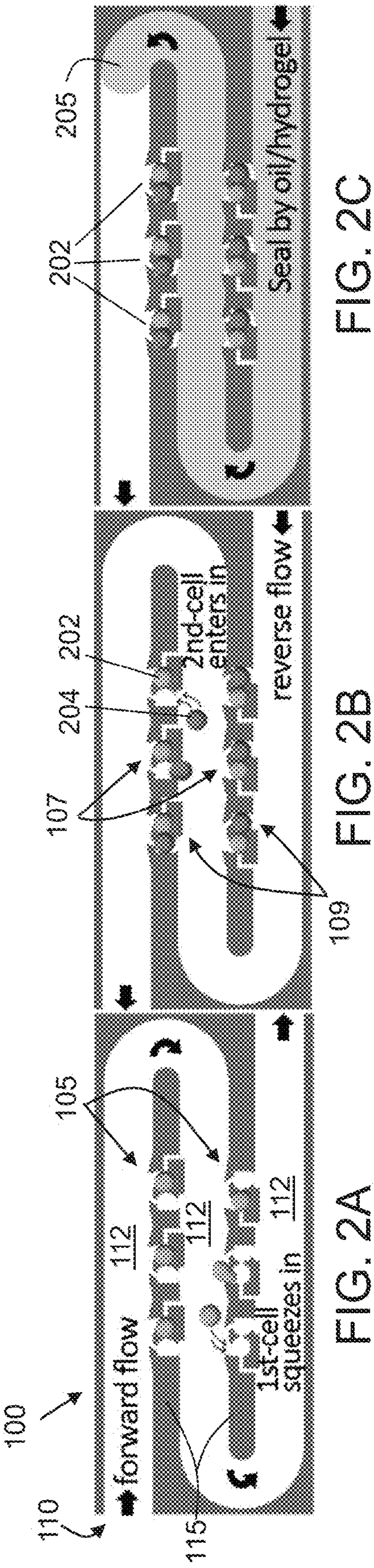
FIG. 2A
FIG. 2B
FIG. 2C

MICROFLUIDIC SINGLE-CELL PAIRING ARRAY FOR STUDYING CELL-CELL INTERACTIONS IN ISOLATED COMPARTMENTS

CROSS-REFERENCES TO RELATED APPLICATIONS

This application is a non-provisional and claims benefit of U.S. Provisional Application No. 62/884,801, filed Aug. 9, 2019, the specification(s) of which is/are incorporated herein in their entirety by reference.

STATEMENT REGARDING FEDERALLY SPONSORED RESEARCH OR DEVELOPMENT

This invention was made with Government support under Grant No. IIP-1538813, awarded by the National Science Foundation. The Government has certain rights in the invention.

BACKGROUND OF THE INVENTION

Field of the Invention

The present invention relates to microfluidic devices, namely, to a microfluidic chip for studying cell-cell interaction at single-cell level.

Background Art

Cell-cell interactions play a vital role in fundamental biological processes including adaptive immune responses, stem cell differentiation, embryogenesis, and tumor progression. One limitation in analyzing the complexity of cell-cell interaction is that current studies are based on mouse models, tissue sections, or bulk cell co-culturing. Considering these are complex systems with various parameters, if only the bulk response is measured, it is difficult to reveal the real process. Therefore, if cell-cell interaction is visualized and characterized at single-cell level, a more proper analysis of cell-cell interaction can be achieved by eliminating irrelevant complex variables.

Microfluidics demonstrates reliable single-cell manipulation enabling the interrogation of this heterogeneous and intricate phenomenon, yet complex designs/operations are usually required in current microfluidic cell-pairing platforms, and cross-pair interference is unavoidable as cell pairs are kept in shared microenvironment. Hence, there exists a need for a microfluidic device that allows for analysis of cell-cell interactions without cross-pair interference.

BRIEF SUMMARY OF THE INVENTION

It is an objective of the present invention to provide a microfluidic trapping array that can efficiently pair single cells in isolated compartments in an easy-to-operate manner, as specified in the independent claims. Embodiments of the invention are given in the dependent claims. Embodiments of the present invention can be freely combined with each other if they are not mutually exclusive.

In some aspects, the present invention features a microfluidic device comprising a microfluidic channel having a first channel portion fluidly connected to a second channel portion, and at least one trapping structure disposed between the first channel portion and the second channel portion. In one embodiment, the trapping structure may comprise a first cavity an opening facing the first channel portion and a first relief channel fluidly connecting the first cavity to the second channel portion, a second cavity adjacent to the first cavity, wherein the second cavity has an opening facing the second channel portion and a second relief channel fluidly connecting the second cavity to the first channel portion, and a connecting channel disposed between the first cavity and the second cavity so as to fluidly connect the two cavities to each other.

In other aspects, the present invention features a microfluidic trapping array disposed in a microfluidic device with a serpentine channel. The microfluidic trapping array may comprise at least one trapping structure disposed between and fluidly connecting two channel portions of the serpentine channel. The trapping structure may comprise a first cavity having an opening facing a first channel portion of the two channel portions and a first relief channel fluidly connecting the first cavity to a second channel portion of the two channel portions. Adjacent to the first cavity is a second cavity having an opening facing the second channel portion and a second relief channel fluidly connecting the second cavity to the first channel portion. A connecting channel may be disposed between the first cavity and the second cavity so as to fluidly connect the two cavities to each other.

In some embodiments, a first cell is squeezed through the narrow opening into the first cavity by a strong forward flow. Afterwards, a second cell is pushed into the second cavity by a low flow rate reverse flow with the first cell locked by the narrow opening. In some embodiments, the double-cell pairs can be sealed by oil phase or hydrogel into isolated compartments, thereby blocking interference from other cell pairs or the surrounding media.

Without wishing to limit the invention to any theory or mechanism, it is believed that the present invention advantageously provides a microfluidic device with a trapping array that can efficiently pair single cells in isolated compartments in an easy-to-operate manner, which can allow for cell-cell interaction analysis, especially at a single-cell level. None of the presently known prior references or works has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

This patent application contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 1 shows an SEM image of a cell-pairing unit of the present invention.

FIGS. 2A-2C show a schematic of double-cell trapping using a trapping array of the present invention. In FIG. 2A, the first type of cells (202, green) are loaded via the high-flow-rate forward-flow and squeeze into the first cell traps. In FIG. 2B, the second type of cells (204, red) are loaded by the low-flow-rate reverse-flow and pushed into the second cell traps. In FIG. 2C, after the trapping array is filled by the double-cell pairs, oil phase or hydrogel is introduced via the reverse-flow to seal each trap by surface tension, so that every double-cell pairs are confined in isolated compartments.

FIGS. 3A-3F shows simulation and experimental micrographs of the single-cell pairing array. The forward-flow streamlines mainly pass through the first cell traps (FIG. 3A) and squeeze cells through the narrow openings into the traps (FIG. 3B). When the first cell traps are filled, the reverse-flow streamlines pass through the second cell traps (FIG. 3C) and push cells in (FIG. 3D). Cells in the first cell traps are not released as they are locked by the 7-μm narrow openings. (FIG. 3E) bright-field and (FIG. 3F) fluorescent images of single HeLa (green) and single K562 (orange) cells paired in the serpentine-shaped cell-pairing array. The double-cell pairs were sealed by immiscible fluorocarbon oil FC-40. Scale bars: 20 μm.

Figures 5A, 5B, 5C, 5D:
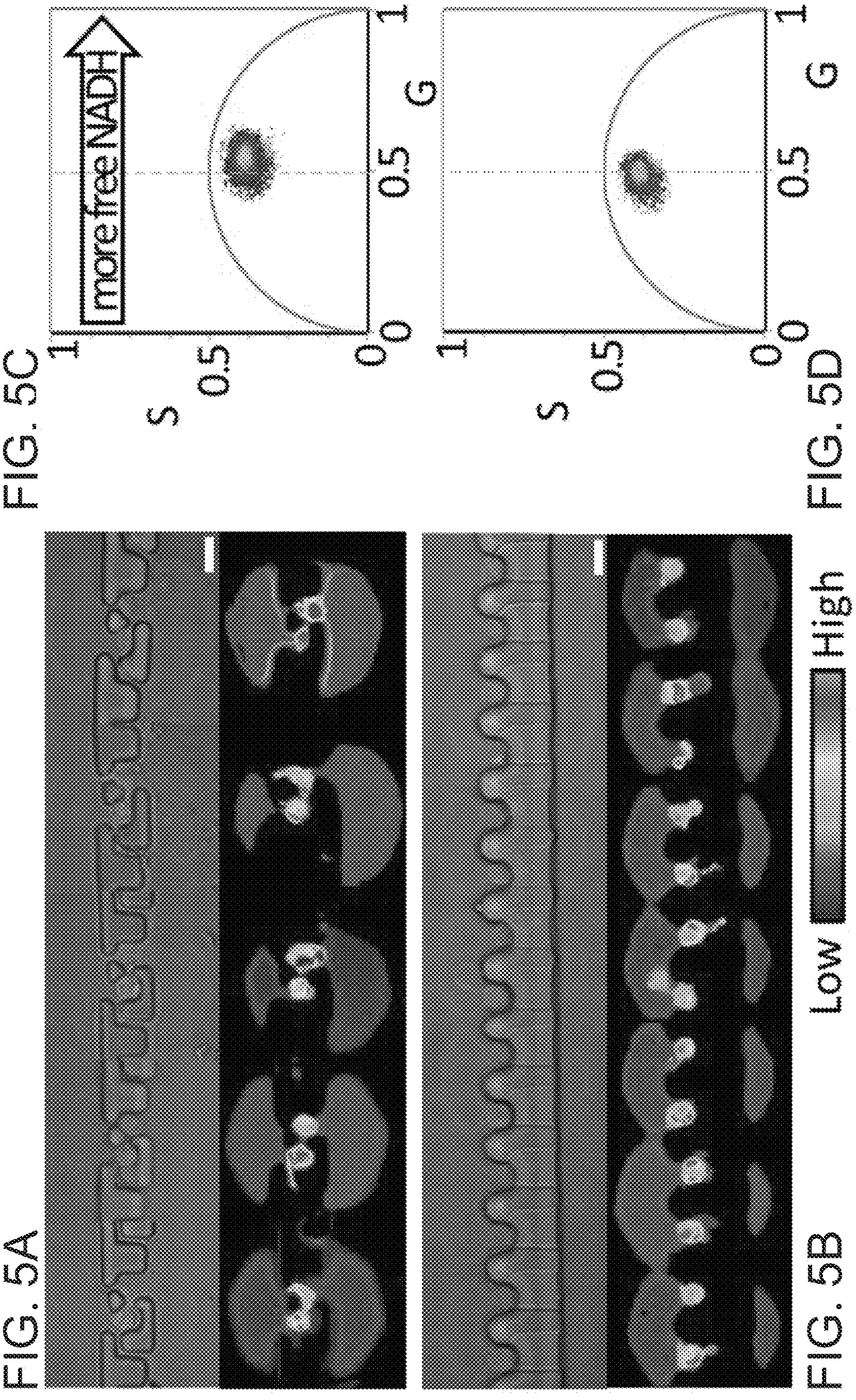
Figure 5E:
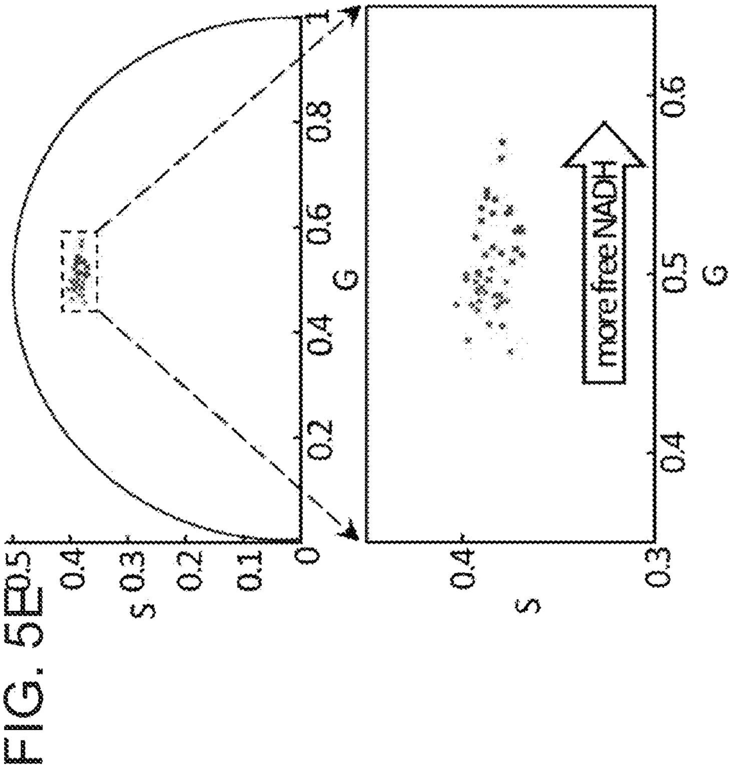
Figure 5F:
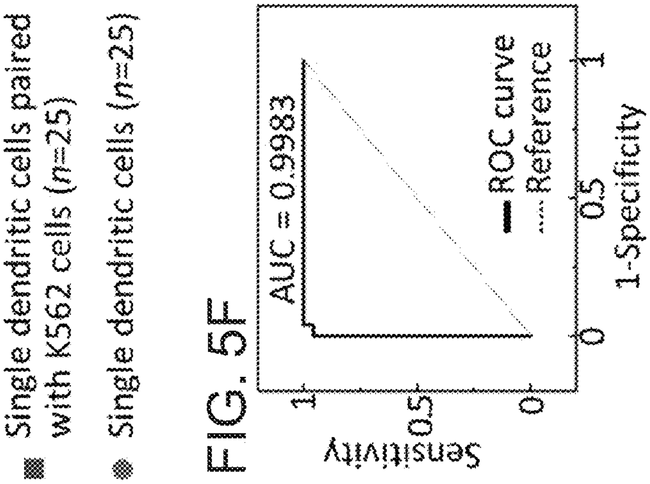
Figure 5G:
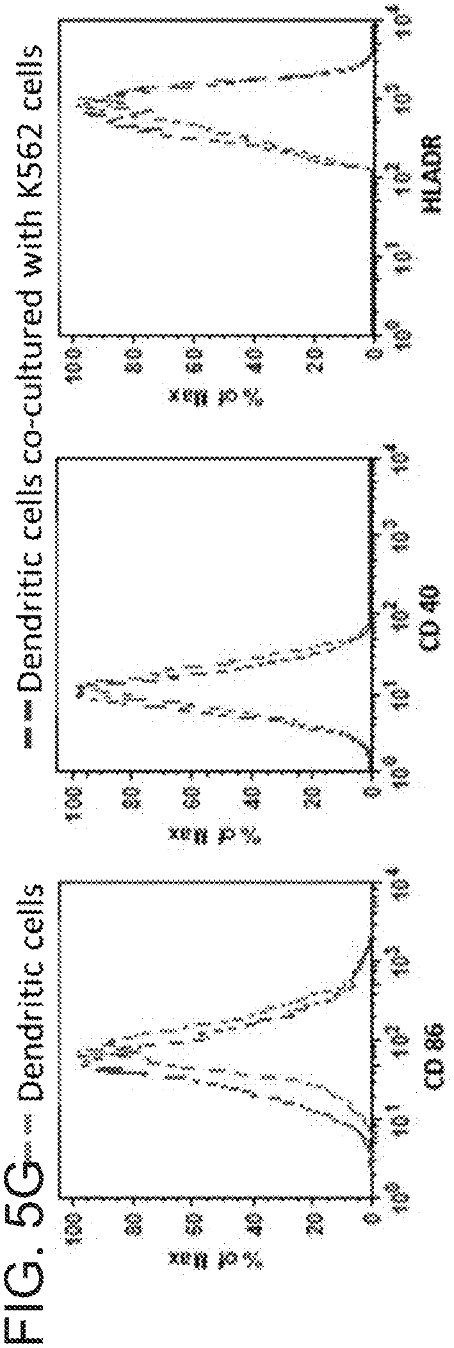
Figure 6A:
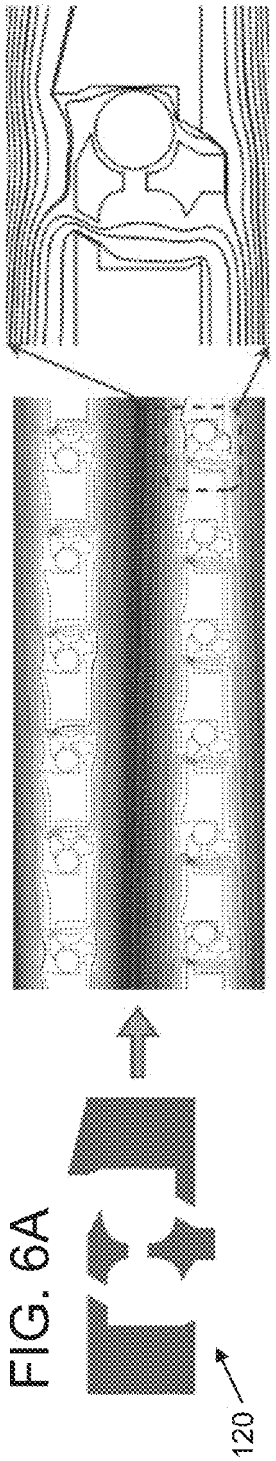

FIGS. 5A-5G show single-cell phasor-fluorescence lifetime imaging microscopy (FLIM) analysis of dendritic cells paired with K562 cells or in single-cell traps. FIGS. 5A and 5B are bright-field and auto-fluorescence images of the dendritic cells paired with K562 lymphoma cells in the cell-paring array (FIG. 5A) and single dendritic cells (FIG. 5B) after 12 hr on-chip culturing in GelMA compartments. FIGS. 5C and 5D are phasor plots of the autofluorescence lifetime signatures of dendritic cells paired with K562 cells (FIG. 5C) and single dendritic cells (FIG. 5D). FIG. 5E is a scatter plot of the average g and s phasor values of individual dendritic cells either paired with K562 cells (red) or in the single-cell trapping array (blue). FIG. 5F is a ROC curve differentiating the paired vs. un-paired dendritic cell populations based on their phasor-FLIM values. The AUC value>0.99, indicating a significant difference. FIG. 5G is a flow cytometry analysis of dendritic cells with and without overnight co-culturing with K562 cells FIG. 6A shows a cell-paring trap with the relief channel at the bottom of the first cell trap. In this design, the reverse flow streamlines tend to push the first cell out with flow through the relief channel.

Figure 6B:
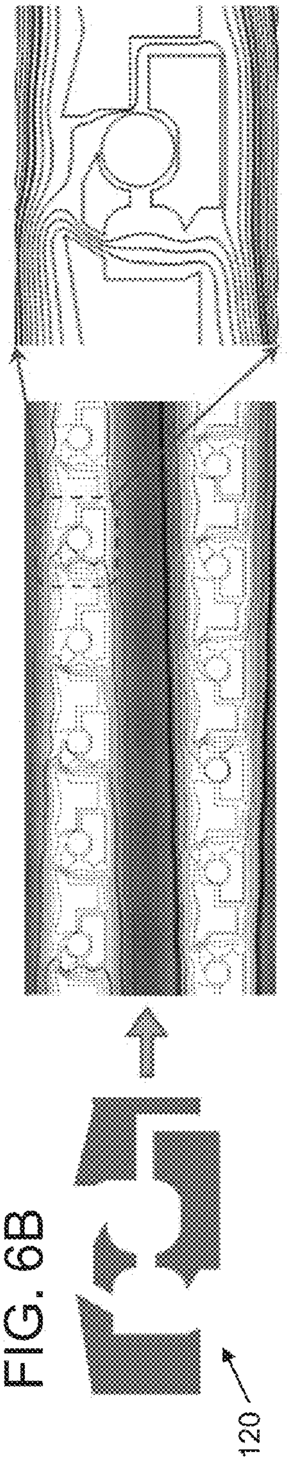

FIG. 6B shows an optimized cell-pairing trap with the relief channel at the side of the first cell trap. As the reverse flow goes through the side of the first cell, the first cell is less likely to be pushed out.

Figure 6C:
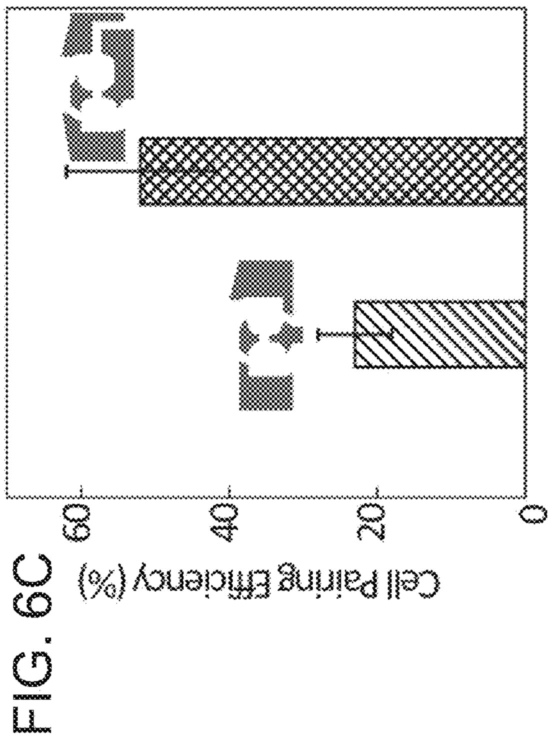

FIG. 6C is a comparison of the pairing efficiencies of the cell-pairing array when the relief channel is on the bottom or on the side of the first cell trap.

DETAILED DESCRIPTION OF THE INVENTION

Following is a list of elements corresponding to a particular element referred to herein:

100 microfluidic device
105 microfluidic trapping array
107 array first side
109 array second side
110 microfluidic channel/serpentine channel
112 channel portion
120 trapping structure
130 first cavity
132 first cavity opening
134 first relief channel
140 second cavity
142 second cavity opening
144 second relief channel
150 connecting channel
200 cell pair
202 first cell
204 second cell
205 sealing fluid As known to one of ordinary skill in the art, a serpentine channel is a channel that winds, or alternates between turning one way and another way. For example, the serpentine channel has a straight section connected to a 180° turn, which is connected to another straight section that is connected to 180° turn, which is connected to another straight section, and so forth. The term "channel portion" refers to the straight or non-turning section of serpentine channel.

Referring now to FIGS. 1 and 2A-2C, the present invention features a microfluidic trapping array disposed in a serpentine channel (110). The microfluidic trapping array (105) may comprise at least one trapping structure (120) disposed between and fluidly connecting two channel portions of the serpentine channel. The trapping structure (120) comprises a first cavity (130), a second cavity (140), and a connecting channel (150). The first cavity (130) has an opening (132) facing a first channel portion (112*a*) of the two channel portions and a first relief channel (134) fluidly connecting the first cavity (130) to a second channel portion (112*b*) of the two channel portions. The second cavity (140) is adjacent to the first cavity (130), and the second cavity (140) has an opening (142) facing the second channel portion (112*b*) and a second relief channel (144) fluidly connecting the second cavity (140) to the first channel portion (112*a*). The connecting channel (150) is disposed between the first cavity (120) and the second cavity (130) so as to fluidly connect the two cavities to each other.

In some embodiments, the present invention features a microfluidic device (100) for cell-cell trapping. In some embodiments, the device (100) may comprise a serpentine channel (110) having a plurality of parallel channel portions (112), and a plurality of microfluidic trapping arrays (105). Each array (105) may be disposed between two adjacent parallel channel portions of the serpentine channel such that one channel portion is disposed on a first side (107) of said array and another channel portion is disposed on a second side (109) that is opposite of the first side (107). In some embodiments, each array (105) may comprise one or more trapping structures (120). Each trapping structure (120) may comprise a first cavity (130) having an opening (132) facing the channel portion disposed on the first side (107) and a first relief channel (134) fluidly connecting the first cavity (130) to the channel portion disposed on the second side (109), and a second cavity (140) adjacent to the first cavity (130). The second cavity (140) has an opening (142) facing the channel portion on the second side (109) and a second relief channel (144) fluidly connecting the second cavity (140) to the channel portion on the first side (104), and a connecting channel (150) disposed between and fluidly connecting the first cavity (130) and the second cavity (120).

In one embodiment, the present invention features a microfluidic device (100) comprising a microfluidic channel (110) having a first channel portion (112*a*) fluidly connected to a second channel portion (112*b*) and at least one trapping structure (120) disposed between the first channel portion (112a) and the second channel portion (112b). The trapping structure (120) comprises a first cavity (130) with an opening (132) facing the first channel portion (112a) and a first relief channel (134) fluidly connecting the first cavity (130) to the second channel portion (112b), a second cavity (140) adjacent to the first cavity (130), wherein the second cavity (140) has with an opening (142) facing the second channel portion (112b) and a second relief channel (144) fluidly connecting the second cavity (140) to the first channel portion (112a), and a connecting channel (150) disposed between the first cavity (130) and the second cavity (140) so as to fluidly connect the two cavities to each other.

As demonstrated in FIGS. 2A-2C, the microfluidic device (100) described herein may be utilized in a method of trapping cells. The method may comprise providing a microfluidic device (100), flowing a first fluid having a plurality of first cells (202) in a forward flow direction through the serpentine channel (110) such that a first cell (202) enters the first cavity (130) of the trapping structures by squeezing through the opening (132) of said first cavity as shown in FIG. 2A, and flowing a second fluid having a plurality of second cells (204) in a reverse flow direction through the serpentine channel (110) such that a second cell (204) enters the second cavity (140) of the trapping structures by squeezing through an opening (142) of said second cavity as shown in FIG. 2B. Thus, the first cavity (130) is occupied by one first cell (202) and the second cavity (140) is occupied by one second cell (204), thereby forming a cell pair (200) comprising the first cell (202) and the second cell (204) trapped in the trapping structure.

In one embodiment, the first fluid flows at a rate such that the first cell is deformed and squeezed through the opening. In another embodiment, the flow rate of the second fluid in the reverse flow direction is lower than a flow rate of the first fluid in the forward flow direction. In other embodiments, the flow rate of the second fluid in the reverse flow direction is the same as the flow rate of the first fluid in the forward flow direction. Preferably, the flow rates are sufficient to increase trapping efficiency.

Without wishing to limit the present invention, the method may trap cells for analysis of cell-cell interactions. In some embodiments, the method may trap cells such that at least 50% of the trapping structures are occupied by cell pairs. In some embodiments, the method may be effective for trapping cells such that at least 75% of the trapping structures are occupied by cell pairs. In other embodiments, the method may be effective for trapping cells such that at least 90% of the trapping structures are occupied by cell pairs.

In some embodiments, the serpentine channel (105) of the microfluidic device has about 2 to 100 parallel channel portions. In other embodiments, the serpentine channel (105) has more than 100 parallel channel portions. In some embodiments, the number of microfluidic trapping arrays (105) may be one less than the number of parallel channel portions. In other embodiments, the microfluidic device may have 1 to 100 trapping arrays (105). In yet other embodiments, the microfluidic device may have more than 100 trapping arrays (105). For instance, the microfluidic device may have 100 to 500 trapping arrays (105). Each trapping array may be juxtaposed between two adjacent parallel channel portions. For instance, each array (105) is patterned into a barrier (115) that is disposed between, or separating, two adjacent parallel channel portions. The barriers (115) may be elongated structures that separate the adjacent channel portions of the serpentine channels. In one embodiment, the cavities of each array are disposed side by side so as to form a single row. Alternatively, the cavities of each array are arranged such that the first cavities form a first row and the second cavities form a second row.

In one embodiment, the number of trapping structures (120) of each array (105) ranges from 1 to 100. In another embodiment, each array (105) may have more than 100 trapping structures (120). Thus, in some embodiments, the microfluidic device may have 1-10,000 trapping structures (120) overall. In other embodiments, the microfluidic device has more than 10,000 trapping structures (120) overall.

In some embodiments, the connecting channel between the two cavities has a width that is smaller than the width of any of the openings, thereby preventing any one of the cells from going to the other cavity. Preferably, the first cavity (130) is sized to fit one cell. The opening (132) of the first cavity has a width that is smaller than a maximum width of the first cavity, thus allowing the first cell to squeeze into the cavity while also preventing the cell from being pushed out of the cavity. In one embodiment, the opening (132) of the first cavity is oriented so as to face away from (e.g. face against) the forward flow direction and towards the reverse flow direction, thereby allowing for higher chance of cell trapping.

In another embodiment, the opening may have a portion thereof jutting out into the channel portion so as to prevent a cell from further flowing down the channel; instead, catching or guiding the cell into the cavity.

Also preferable is the second cavity (140) being sized to fit one cell. The opening (142) of the second cavity has a width that is smaller than a maximum width of the second cavity, thus allowing the second cell to squeeze into the cavity while also preventing the cell from being pushed out of the cavity. In some embodiments, the opening (142) of the second cavity is oriented so as to face away from (e.g. face against) the reverse flow direction and towards the forward flow direction, thereby allowing for higher chance of cell trapping. The opening (142) may have a portion thereof jutting out into the channel portion so as to prevent a cell from further flowing down the channel and instead catching or guiding the cell into the cavity.

In some embodiments, the first cavity (130) and the second cavity (140) are the same in size and/or shape. However, the first cavity and the second cavity are not necessarily of the same size. In some other embodiments, the first cavity (130) and the second cavity (140) are different in size and/or shape. In other embodiments, the first cavity (130) is sized to fit a single cell of one type whereas the second cavity (140) is sized to fit a single cell of another type. In the figures, the two cavities are shown to be similar in size, however, they are not limited to this configuration. As an example, the first cavity (130) may be smaller than the second cavity (140) so as to fit a smaller cell.

In some embodiments, the first relief channel (134) has a width that is smaller than the width of the opening (132) of the first cavity. In one embodiment, the first relief channel (134) may be an L-shaped channel connecting a side of the first cavity to the channel portion disposed on the second side (109) of the array. Said side of the first cavity may be directly opposite of the connecting channel (150). Alternatively, the first relief channel (134) may be a straight or curved channel. This straight or curved channel may be opposite of the opening (132) of the first cavity, or angled relative to the opening (132). In other embodiments, the second relief channel (144) has a width that is smaller than the width of the opening (142) of the second cavity. In one embodiment, the second relief channel (144) may be opposite of the opening (142) of the second cavity (140), or angled relative to the opening (142).

In some embodiments, the floor or bottom surface of the relief channels may lie on a different plane than that of the channel portions. In other words, the floor of the relief channels may be raised relative to the channel portion floor or bottom surface. Similarly, the floor or bottom surface of the connecting may lie on a different plane than that of the channel portions. For instance, the floor of the connecting channel may be raised relative to the channel portion floor.

According to some embodiments, the device may be used to trap cells having diameters ranging from about 10 μm to about 30 μm. In other embodiments, the cell diameters may be larger than 30 μm. Accordingly, the width of the cavities may be the same or slightly larger than the cell diameter, for example, 1-4 μm larger. A height of the cavity may also be the same or slightly larger than the cell diameter, for example, 1-4 μm larger. In some embodiments, the width of the cavity openings may be %, half, or less than half of the cell diameter. In other embodiments, the width of the connection channel may be half, a quarter, or less than a quarter of the cell diameter.

Figure 4A:
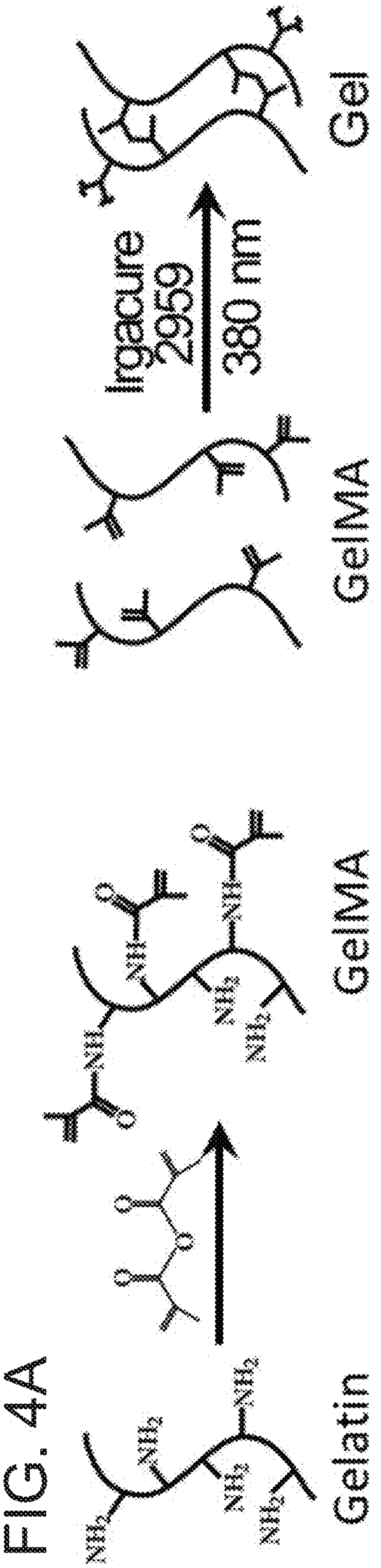
FIG. 4A shows a reaction scheme and photo-crosslinking mechanism of GelMA.
Figure 4B:
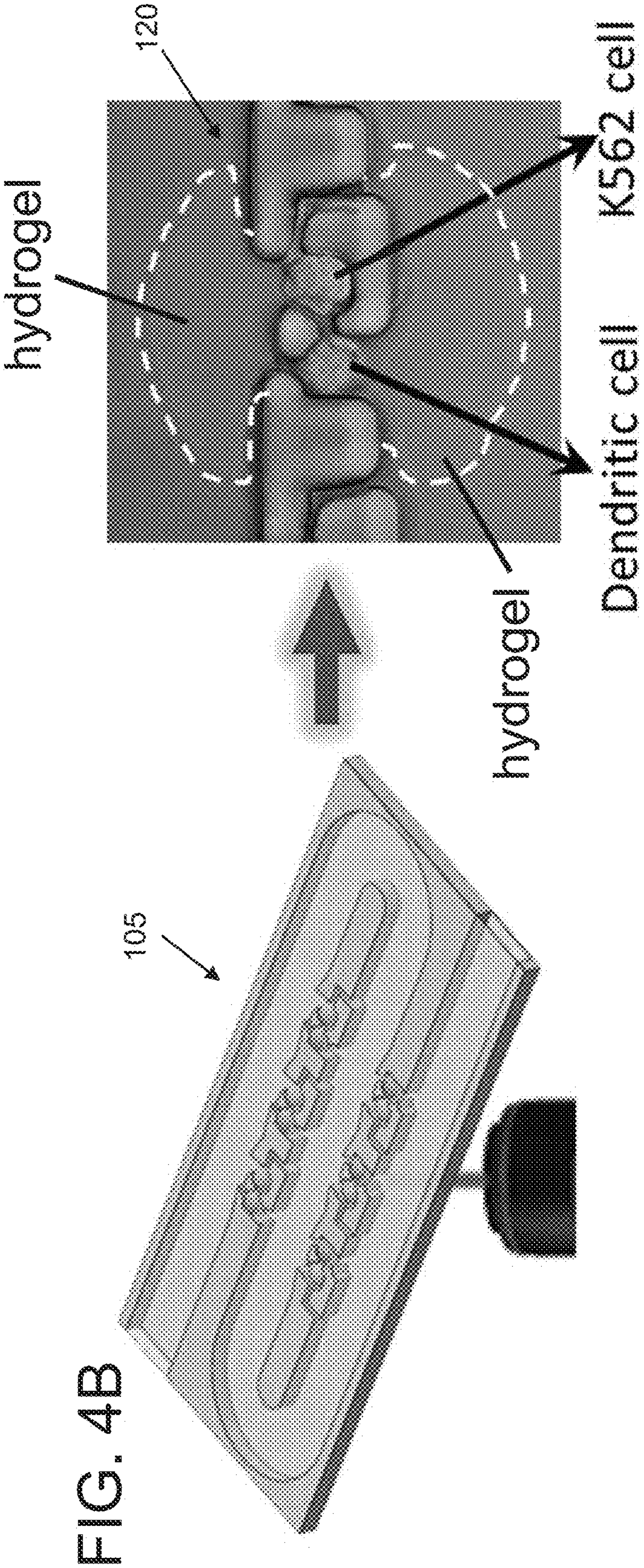
FIG. 4B is a schematic illustration of forming GelMA compartments after dendritic cells and K562 cells are paired in the cell-pairing array.

In other embodiments, as shown in FIG. 2C, the method may further comprise flowing a sealing fluid (205) in either flow direction so as to seal the cell pair (200) such that the cell pair (200) is confined within and isolated in the trapping structure, thereby blocking interference from other cell pairs (200) or surrounding media. In one embodiment, the sealing fluid (205) is an oil. In another embodiment, the sealing fluid (205) is a hydrogel precursor. As shown in FIG. 4A, the hydrogel precursor may be a gelatin modified by methacrylic anhydride. In some embodiments, the hydrogel precursor may be photopolymerized to form a hydrogel as shown in FIG. 4B. Without wishing to be limited to a particular theory or mechanism, the hydrogel is effective for continuously supplying media to the cell pair (200) for long-term cell culturing.

EXAMPLE

The following is a non-limiting example of the present invention. It is to be understood that said example is not intended to limit the present invention in any way. Equivalents or substitutes are within the scope of the present invention.

Chip Design

In an exemplary embodiment, the cell-pairing array, which may comprise a serpentine channel with 10 double-cell traps along each row, works by hydrodynamic sequential arraying and flow-induced cell deformability. Traps in adjacent rows are in a mirrored configuration because of the serpentine shape. Each trapping unit, as shown in the scanning-electron-microscopic (SEM) image (FIG. 1), has a first cell trap with a narrow opening facing the forward-flow direction, and a second cell trap with a narrow opening facing the reverse-flow direction. The trap size is similar to the target cell diameter to secure single-cell occupancy, and the two traps are connected by an opening in between to allow direct cell-cell contact for connexon formation.

For mammalian cells with a diameter ~15 μm, the empirically optimized channel height is 16 μm, trap size is 15 μm, narrow opening is 7 μm, and connection opening is 4 μm. The first type of cells squeeze through the narrow openings when pushed and deformed by the strong forward-flow and sequentially enter the first cell traps (FIG. 2A). A low-flow-rate reverse-flow introduces and pushes the second type of cells into the second cell traps with wider openings (FIG. 2B), while cells in the first cell traps are locked by the narrow openings and not released. The double-cell pairs are then sealed by flowing oil phase or hydrogel along the reverse-flow direction (FIG. 2C), so that each cell-pair is confined within an isolated compartment, blocking the interference from other pairs or the surrounding media.

Cell-Cell Pairing Principle and Efficiency

Figures 3A, 3B, 3C, 3D, 3E, 3F:
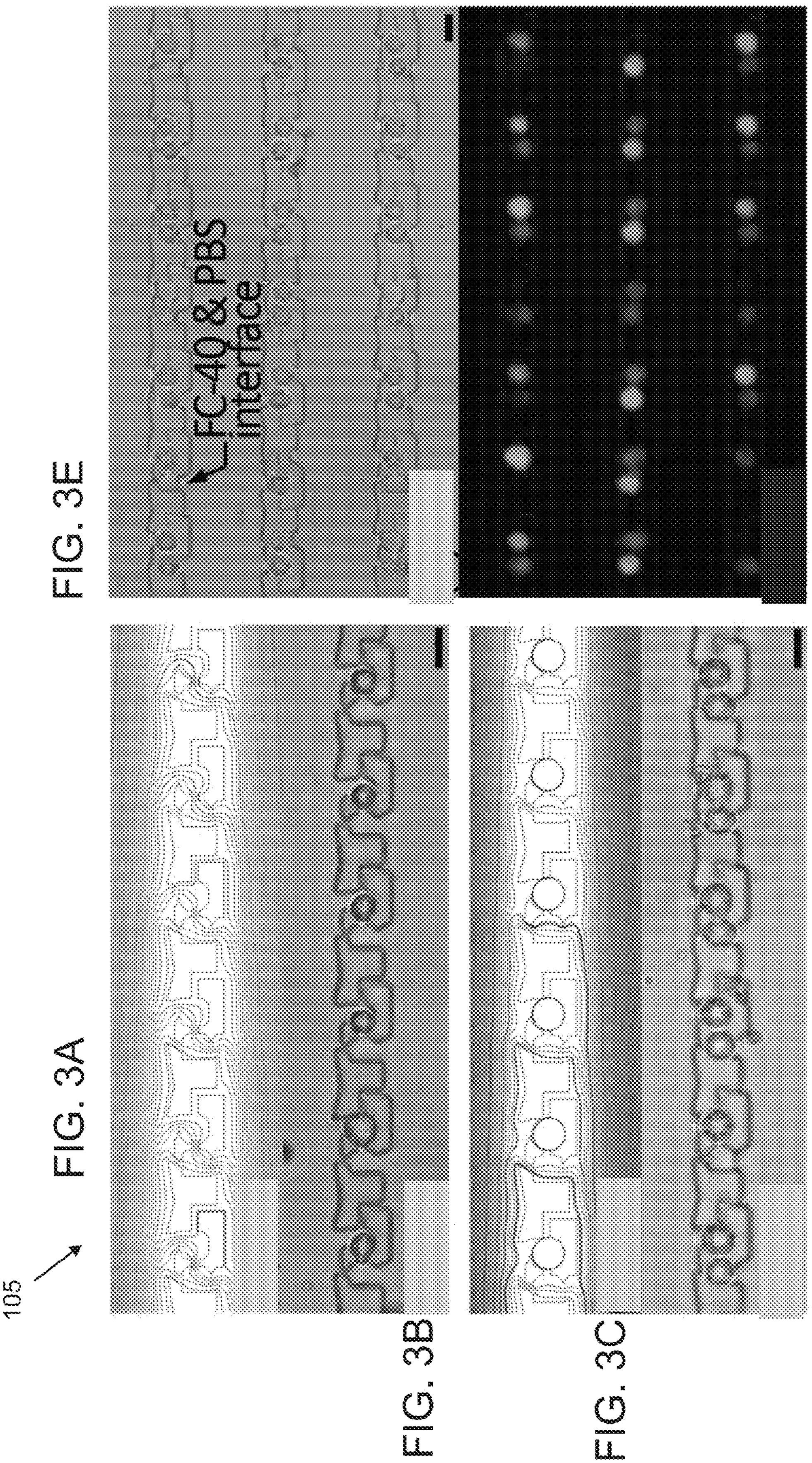

In forward-flow, cells follow the laminar-flow streamlines (FIG. 3A) into the first cell traps (FIG. 3B). The side channel (3.5-μm-wide) of the first cell trap branches the flow to assist the cell to stay in the trap instead of squeezing through the connection opening. Although there are streamlines passing through the second cell trap's narrow channel (3.5-μm-wide) which faces the forward-flow direction, it is too narrow for cells to squeeze into. Preferably, a majority, if not all, of the first cell traps are filled. In reverse-flow, the reverse-flow streamlines pass through the second narrow opening (FIG. 3C) and push the second type of cells into the second cell trap (FIG. 3D). As shown in FIGS. 3E and 3F, HeLa cells (Calcein-AM-labeled, green-fluorescent) were loaded with a forward-flow rate of 5 μL/min, and K562 cells (CMTMR-labeled, orange-fluorescent) were loaded with a reverse-flow rate of 1 μL/min. FC-40 sealed the cell-pairs in separate compartments. A heterotypic single-cell pairing efficiency of 45-65% (average 52±10%) was achieved.

Cell-Pairing Array with Hydrogel Compartments

While sealing the cell-pair compartments by oil phase successfully created isolated compartments, the oil sealing does not allow the continuous supply of media for long-term cell culturing, which is not suitable for continuous monitoring of cell-cell interactions. To overcome this challenge, an alternative method to keep the paired cells in hydrogel compartments is developed using GelMA, gelatin modified by methacrylic anhydride. GelMA is biocompatible for long-term cell culturing and is photo-polymerizable in a few seconds (FIG. 4A). By shining a fluorescence microscope on the cell-pairing array with cells suspended in GelMA, hydrogel compartments are generated in a few seconds (as the mushroom shape highlighted by the white dotted line in FIG. 4B). The pairing of one dendritic cell with one K562 cell is demonstrated as a proof of concept.

Dendritic Cell-Cancer Cell Interaction at Single-Cell Level

K562 lymphoma cells in GelMA solution were introduced into the chip via forward flow, and dendritic cells suspended in GelMA solution were introduced by reverse flow. Each cell pairs were shined at 385 nm for less than 3 seconds and gelled. The paired cells in GelMA compartments were cultured for 12 hours on-chip inside the incubator with continuous supply of RPMI medium. Thereafter, the metabolic pattern of dendritic cells was analyzed by fluorescence lifetime imaging microscopy (FLIM). As for the control group, dendritic cells were trapped in the single-cell array and cultured under the same condition in GelMA compartments.

The bright-field and auto-fluorescence images of the dendritic cells either paired with K562 lymphoma cells or in single-cell traps are plotted in FIGS. 5A and 5B, with their corresponding phasor-FLIM plots shown in FIGS. 5C and 5D, respectively. As seen from the phasor plot, there was a clear shift towards shorter lifetime and a higher ratio of free-NADH for dendritic cells paired with K562 cells. This trend was also confirmed in the scatter plot (FIG. 5E), where the single-cell average phasor-FLIM values of 25 dendritic cells paired with lymphoma cells in comparison with 25 single dendritic cells were collected. The AUC value in distinguishing these two types of DCs was 0.998 (FIG. 5F), showing the significant difference of the dendritic cells' metabolic status upon pairing with cancer cells.

Based on the phasor-FLIM results of the single-cell paring array, it is clear that dendritic cells are more glycolytic upon pairing with cancer cells. Without wishing to be limited to a particular theory or mechanism, upon activation, dendritic cells rely on glycolysis for the rapid generation of ATP for endocytosis and cytokine biosynthesis. To explain the metabolic switch at biomolecular level, dendritic cells after overnight co-culturing with K562 cells were analyzed using flow cytometry. As shown in FIG. 5G, there existed an increased expression of CD86, CD40, and HLADR, especially CD86. As CD86 is a surface marker of dendritic cell activation, the flow cytometry results indicated that the glycolytic metabolic pattern that was generated might be due to the activation of dendritic cells upon pairing with K562 cells.

Optimization of the Trapping Array

Based on experimental observation and simulation validation, in some embodiments, it is critical that the relief channel of the first cell trap is on the side instead of at the bottom. As illustrated in FIG. 6A, when the relief channel is at the bottom of the first cell trap, as the reverse flow goes through the relief channel, the first cell could still be pushed out although there is a constriction. By moving the relief channel from the bottom to the side of the first cell trap as shown in FIG. 6B, the reverse flow goes through the side of the first cell, and it is less likely that the first cell will be pushed out. Referring to FIG. 6C, the double-cell pairing efficiency with the relief channel on the side is 52±10%, which is twice as high as that of the relief channel on the bottom (23±5%).

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method of trapping cells, said method comprising:

a. providing a microfluidic device (100) comprising;

i. a serpentine channel (110) having a plurality of parallel channel portions (112); and ii) a plurality of microfluidic trapping arrays (105), wherein each array of the plurality of microfluidic trapping arrays (105) is disposed between two adjacent parallel channel portions (112) of the serpentine channel (110) such that one channel portion of the two adjacent parallel channel portions is disposed on a first side (107) of each array and the other channel portion of the two adjacent parallel channel portions is disposed on a second side (109) of each array that is opposite of the first side (107), wherein each array of the plurality of microfluidic trapping arrays (105) comprises one or more trapping structures (120), each trapping structure (120) comprising:

1. a first cavity (130) having an opening (132) facing the channel portion disposed on the first side (107) and a first relief channel (134) fluidly connecting the first cavity (130) to the channel portion disposed on the second side (109);
2. a second cavity (140) adjacent to the first cavity (130), wherein the second cavity (140) has an opening (142) facing the channel portion on the second side (109) and a second relief channel (144) fluidly connecting the second cavity (140) to the channel portion on the first side (104); and
3. a connecting channel (150) disposed between and fluidly connecting the first cavity (130) and the second cavity (120);

b. flowing a first fluid having a plurality of first cells (202) in a forward flow direction through the serpentine channel (110) such that a first cell (202) enters the first cavity (130) of a trapping structure by squeezing through the opening (132) of said first cavity, wherein said first cavity (130) is occupied by one first cell (202);

c. flowing a second fluid having a plurality of second cells (204) in a reverse flow direction through the serpentine channel (110) such that a second cell (204) enters the second cavity (140) of the trapping structure by squeezing through the opening (142) of said second cavity, wherein said second cavity (140) is occupied by one second cell (204), thereby forming a cell pair (200) comprising the first cell (202) and the second cell (204) trapped in the trapping structure.

2. The method of claim 1 further comprising flowing a sealing fluid (205) in either flow direction so as to seal the cell pair (200) such that the cell pair (200) is confined within and isolated in the trapping structure, thereby blocking interference from other cell pairs (200) or surrounding media.

3. The method of claim 1, wherein the first fluid flows at a rate such that the first cell is deformed and squeezed through the opening.

4. The method of claim 1, wherein a flow rate of the second fluid in the reverse flow direction is lower than a flow rate of the first fluid in the forward flow direction.

5. The method of claim 1, wherein the method traps cells such that at least 50% of the trapping structures are occupied by cell pairs.

6. The method of claim 1, wherein the method traps cells for analysis of cell-cell interactions.

* * * * *